US008154395B2

(12) United States Patent
Taylor

(10) Patent No.: US 8,154,395 B2
(45) Date of Patent: Apr. 10, 2012

(54) CHILD SAFETY SEAT SYSTEM

(76) Inventor: Marc Taylor, Atco, NJ (US)

( * ) Notice: Subject to any disclaimer, the term of this patent is extended or adjusted under 35 U.S.C. 154(b) by 241 days.

(21) Appl. No.: 12/660,069

(22) Filed: Feb. 20, 2010

(65) Prior Publication Data

US 2011/0205060 A1 Aug. 25, 2011

(51) Int. Cl.
*B60Q 1/00* (2006.01)

(52) U.S. Cl. .................. 340/457; 340/573.1; 340/573.4; 340/425.5; 340/667; 180/273

(58) Field of Classification Search ............... 340/573.1, 340/573.4, 457, 522, 666, 667, 686.1, 425.5, 340/428, 426.28, 426.3; 200/85 A; 307/9.1, 307/10.1; 180/271, 273, 290
See application file for complete search history.

(56) References Cited

U.S. PATENT DOCUMENTS 6,104,293 A * 8/2000 Rossi ......................... 340/573.1
7,663,493 B2 * 2/2010 Monzo et al. .............. 340/573.1
7,714,737 B1 * 5/2010 Morningstar ................. 340/667
7,733,228 B2 * 6/2010 Lee et al. .................. 340/572.1
* cited by examiner

*Primary Examiner* — Anh V La
(74) *Attorney, Agent, or Firm* — Stuart M. Goldstein

(57) ABSTRACT

A portable child safety seat system has three lightweight, easily transferable modular components. The system utilizes one or more pressure sensor switches configured to be placed under the cushion of a vehicle's infant seat or cushions of multiple infant seats to detect the presence of a child in that seat. Electrical lines connect the pressure sensor switch to an interface unit which contains a back-up electrical power source, i.e. a rechargeable battery. The interface unit is in turn connected by electrical lines to a controller component which has a plug section for receiving electricity and a display section to indicate the presence of the child in the infant seat. When a child is in the infant seat and the vehicle's engine is running, the pressure sensing switch is closed and electricity is directed to light the display section of the controller. When the engine is not running, electricity is directed from the back-up battery to light the display section. An optional voltage sensing circuit is provided for use with certain types of vehicles.

11 Claims, 2 Drawing Sheets

CHILD SAFETY SEAT SYSTEM

BACKGROUND OF THE INVENTION

There have been and continue to be an alarming number of deaths caused as a result of infants and young children being inadvertently left in child seats secured within hot motor vehicles. These tragedies could easily have been avoided by the use of a vehicle installed child monitoring system, designed to provide notice to the driver of the presence of a child.

The prior art proposes a variety of systems which may be utilized to detect an infant who remains in a car seat. However, none of the systems are currently in place in motor vehicles. This may be explained by the fact that many of the systems are impractical, are difficult to install, are expensive, and/or simply do not work properly. Significantly, all these prior systems are designed to be permanently installed in vehicles. And car, mini-van and SUV manufacturers have not yet found it economical to incorporate such systems into new models. The placement of permanent installations into existing vehicles is also not practical and retrofitting vehicles is expensive.

SUMMARY OF THE INVENTION

It is thus the object of the present invention to overcome the disadvantages and limitations of prior child safety seat systems.

It is the object of the present invention to provide a child safety seat system which is portable and which can immediately be utilized in any vehicle.

It is another object of the present invention to provide a child safety seat system which does not rely on and operates independently of any vehicle manufacturer component.

It is a further object of the present invention to provide a child safety seat system which is highly effective in providing clear and unmistakable notice of the presence of a child in any infant seat or more than one child in more than one infant seat in a single vehicle.

It is still another object of the present invention to provide a child safety seat system which comprises lightweight modular components which can be readily installed in any vehicle and then be easily removed and installed in another vehicle.

It is another object of the present invention to provide a child safety seat system which has relatively few components and is economical to manufacture.

These and other objectives are accomplished by the present invention, a portable child safety seat system basically comprising three lightweight, easily transferable modular components. The system utilizes one or more pressure sensor switches configured to be placed under the cushion of a vehicle's infant seat or cushions of infant seats to detect the presence of a child in that seat. Electrical lines connect the pressure sensor switch to an interface unit which contains a back-up electrical power source, i.e. a rechargeable battery. The interface unit is in turn connected by electrical lines to a controller component which has a plug section for receiving electricity and a display section to indicate the presence of the child in the infant seat. When a child is in the infant seat and the vehicle's engine is running, the pressure sensing switch is closed and electricity is directed to light the display section of the controller. When the engine is not running, electricity is directed from the back-up battery to light the display section. An optional voltage sensing circuit is provided for use with certain types of vehicles.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
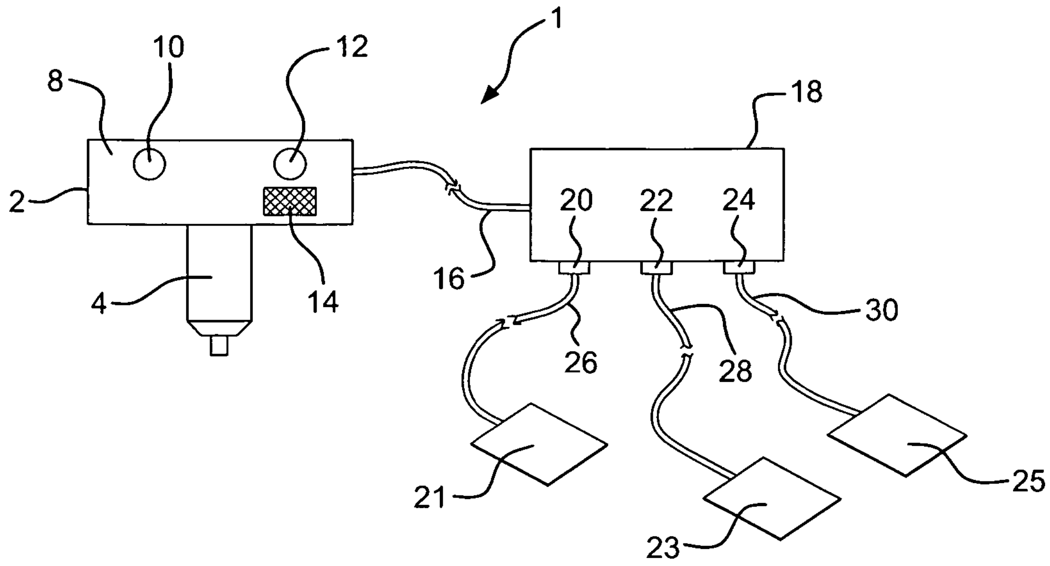
FIG. 1 shows the modular components of the present invention.
Figure 2:
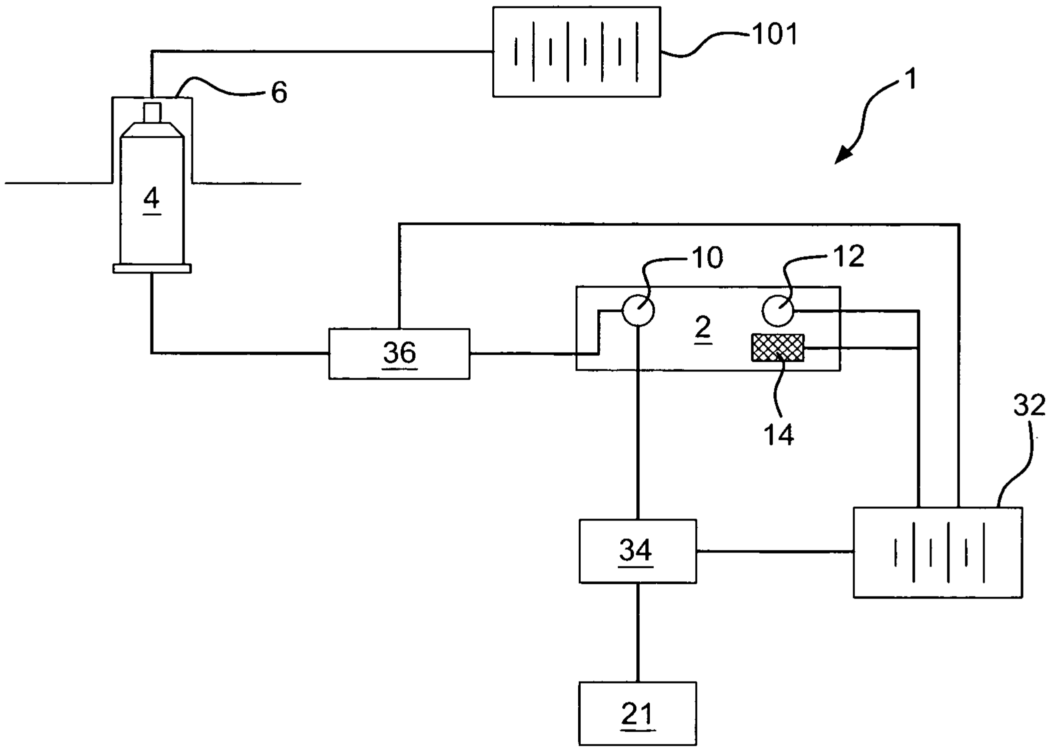
FIG. 2 is a schematic of the modular components and electrical system of the present invention.
Figure 3:
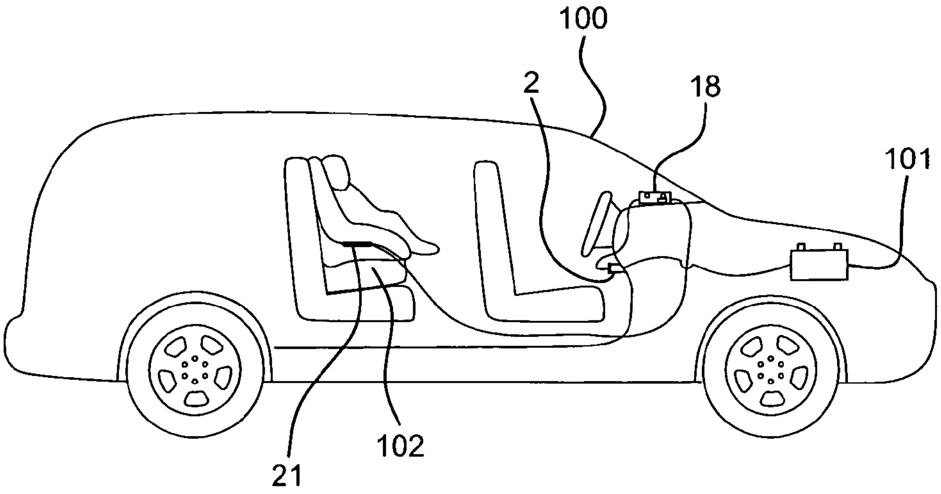
FIG. 3 shows the present invention as it would be installed in a motor vehicle.

The child seat safety system 1 of the present invention comprises a plurality of portable modular components which are easily and readily separable and removeable from a motor vehicle for use between motor vehicles. System 1 comprises controller component 2 having removeable plug section 4 for insertion into cigarette or power outlet 6 of a motor vehicle 100 with electric battery 101. Controller 2 also has display section 8 with green LED 10 and red LED 12 and audible alarm transmitter 14.

Controller 2 is connected, via electrical wire, cable, or similar line 16 to interface component 18 having one or more plug-in receptacles, e.g. 20, 22, and 24, for receiving electrical lines 26, 28, and 30. Interface 18 also comprises back-up battery 32.

One or more pressure sensing switches 21, 23, and 25 connected to electrical lines 26, 28, and 30, respectively, constitute the final component or components of system 1. Each of these sensing switches is configured to be positioned beneath the cushion of an infant seat 102 in motor vehicle 100 for detecting the presence of a child sitting in the seat. While three receptacles and pressure sensing switches are shown and described herein, interface 18 can have any number of receptacles and sensing switches and the invention should not be considered so restricted. Each sensing switch can be placed beneath the cushions of one or more infant seats 102 in a motor vehicle as needed.

With the engine of motor vehicle 100 running, controller 2 is inserted into power outlet 6 via plug section 4 to receive electric current from battery 101. Pressure sensing switch 21 will sense the presence of a child positioned in infant seat 102. It is then designed to close to complete an electrical circuit between sensing switch 21 and controller 2 connected to battery 101, in order to light green LED 10; thus providing notice to the driver of the child in the seat. When the child is removed from seat 102, sensing switch 21 opens. The electrical circuit is opened as well, thereby cutting off electric current to and turning off LED 10. System relay 34 ensures that electric current from battery 101 flows to controller 2 to light LED 10 under these circumstances. Relay 34 can optionally be positioned within the housing of controller component 2 or within the housing of interface component 18.

Motor vehicles with "key hot" electrical systems are those which present a flow of electric current from the vehicle's battery only when the engine is running. In vehicles with this system, pressure sensing switch 21 will continue to sense the presence of a child in seat 102 even when the motor vehicle engine is turned off. However, relay 34 will now direct electric current from back-up battery 32 to power and light red LED 12 and sound audible alarm 14, providing warning that the child is still in the seat.

An optional voltage sensing circuit is provided in system 1 for use in vehicles with "constant hot" plug or continuous electrical flow systems, that is systems which provide a continuous supply of electrical power from battery 101, regardless of whether the engine is running. Thus, the voltage sensing circuit will provide electric current to power system 1 for either "key hot" or "constant hot" vehicles.

Figure 4:
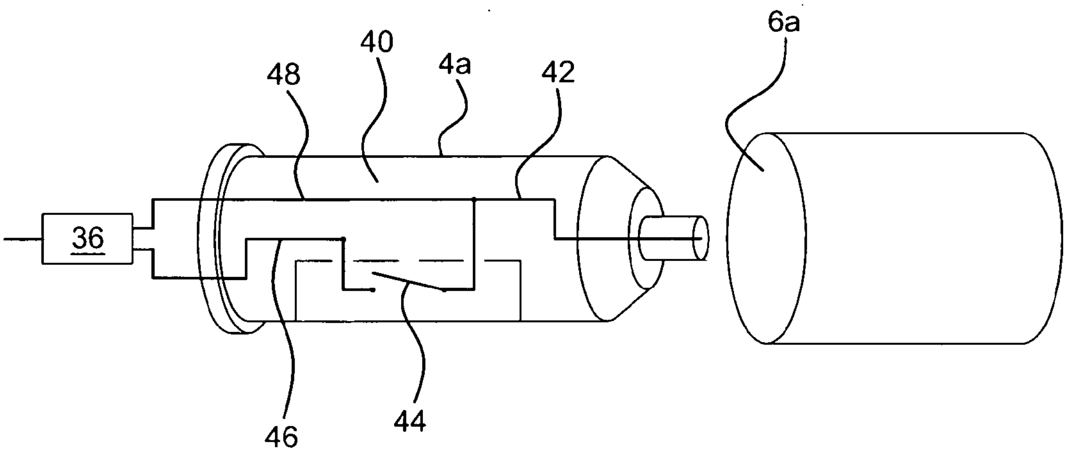
FIG. 4 is a schematic representation of the voltage sensing circuit of the present invention.

Inline voltage sensing circuit 40, best seen in FIG. 4, constantly monitors the voltage of the vehicle. A vehicle that has its engine running causes the charging system to charge the electrical system. This charge raises the voltage of the system to approximately 13.4 volts from a normal twelve volt battery, e.g. battery 101. Once the engine is turned off, the charging system is also off, lowering the voltage, known as resting voltage, to 12.4-12.8 volts.

When plug section **4*a* is inserted into a "constant hot" power outlet 6*a*, the voltage sensing switch 44 senses an increase in the vehicle's voltage through circuit line 42, caused by the engine being turned on. The voltage sensing switch will close, completing the circuit and sending electrical current through sensing switch 44, circuit 46, and relay 36 to power system 1 to provide notice of a child is positioned in infant seat 102**.

However, when the engine is turned off, there is a drop in voltage. Voltage sensing switch 44 will sense this and open thereby opening circuit 46, but allowing current flow from battery 101 through circuit 42 and 48, through relay 36 to power system 1.

In the event that plug section **4*a* is inserted into a "key hot" power outlet 6*a*, voltage sensing circuit 40 will power up as described above and will simply shut off when the engine is turned off, due to the loss of electrical current to the power outlet. In this case, back-up battery 32 will provide the power to system 1**, as previously described.

While voltage sensing circuit 40 is shown as being inside plug section **4*a***, the system could also be hard-wired for installation within the vehicle itself.

Child seat safety system 1 thus provides an efficient and effective system to provide notice to the motor vehicle operator that there is a child present in the vehicle's infant seat, whether the engine is turned on or turned off. Moreover, the system provides a significant advantage in that all its components are self contained and modular for quick and ready installation in a vehicle and, most advantageously, is easily removeable and portable to be used interchangeably among various vehicles in which there are child safety seats. Interface 18 additionally allows the use of more than one connection, for multiple seats located in the same vehicle and, once again, provides for the ready removal of the system between vehicles.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A portable, modular child seat safety system for warning of the presence of a child in an infant seat having an infant seat cushion, the infant seat being located in an electric battery powered motor vehicle with an engine, the system comprising:

pressure sensor switch means for detecting the presence of a child in an infant seat, said pressure sensor switch means being removeably positioned beneath the infant seat cushion of at least one infant seat;

electrical line means extending from the pressure sensor switch means for conducting electricity through an electrical circuit when the child is in the infant seat;

an interface unit comprising receptacle means for the removeable connection of the electric line means, the interface unit further comprising a secondary source of electricity for powering the circuit;

second electrical line means extending from the interface unit for conducting electricity when the child is in the infant seat;

controller means having a removeable plug section for receiving electricity from the battery of the motor vehicle and a display section to indicate the presence of the child in the infant seat, the second electrical line means extending from the interface unit to the controller means;

relay means for directing the source of electricity through the circuit, whereby when the child is positioned in the infant seat and the vehicle's engine is running, the pressure sensing switch means closes the electrical circuit and the relay means directs electricity from the battery to the controller means to indicate the presence of the child in the infant seat, and when the vehicle's engine is not running the relay means optionally directs electricity from the secondary source of electricity to the controller means to indicate the presence of the child in the infant seat;

the pressure sensing switch means, the controller means, the interface unit, the relay, and the electrical lines each comprising individual modular components of the system which are not permanently installed within the motor vehicle, all said modular components being separable and removeable from the motor vehicle so that they are portably interchangeable for use between different motor vehicles.

2. The child safety seat system as in claim 1 wherein further comprises voltage sensing means for detecting electrical system voltage from the battery of the motor vehicle.

3. The child safety seat system as in claim 2 wherein the voltage sensing means comprises a voltage sensing circuit having a voltage sensing switch whereby when the engine is running, engine voltage causes the voltage sensing switch to close supplying electricity from the battery to power the system, and when the engine is not running and the engine voltage decreases, the voltage sensing switch opens directing the secondary source of electricity to supply power to the system.

4. The child safety seat system as in claim 3 further comprising a second relay means to direct the secondary source of electricity to supply power to the system when the voltage sensing switch opens.

5. The child safety seat system as in claim 2 wherein the voltage sensing means is located in the controller means.

6. The child safety seat system as in claim 1 wherein the pressure sensing switch means comprises a plurality of sensor switches, the receptacle means comprises a plurality of receptors for the connection of the sensor switches, and the electrical line means comprises a plurality of lines interconnecting the sensor switches and the receptors, one of the sensor switches being removeably positioned beneath the infant seat cushion of the infant seat, and the other switches being removeably positioned beneath the infant seat cushions of other infant seats located in the motor vehicle.

7. The child safety seat system as in claim 1 wherein the relay means is in the controller.

8. The child safety seat system as in claim 1 wherein the relay means is in the interface unit.

9. The child safety seat system as in claim 1 wherein the display comprises different LED's indicating the presence of the child in the infant seat when the engine is running and when the engine is not running.

10. The child safety seat system as in claim 1 further comprising an audible alarm located in the controller to indicate the presence of the child in the infant seat when the engine is not running.

11. The child safety seat system as in claim 1 further comprising an audible alarm located in the interface unit to indicate the presence of the child in the infant seat when the engine is not running.

* * * * *